Patented Sept. 12, 1939

2,172,535

UNITED STATES PATENT OFFICE

2,172,535

CONVERSION OF ACYCLIC HYDROCARBONS TO CYCLIC HYDROCARBONS

Aristid V. Grosse and Jacque C. Morrell, Chicago, Ill., assignors to Universal Oil Products Company, Chicago, Ill., a corporation of Delaware No Drawing. Application January 24, 1938, Serial No. 186,654

7 Claims. (Cl. 260—668)

This invention relates particularly to the conversion of straight chain hydrocarbons into closed chain or cyclic hydrocarbons.

More specifically it is concerned with a process involving the use of special catalysts and specific conditions of operation in regard to temperature, pressure and time of reaction whereby aliphatic hydrocarbons can be efficiently converted into aromatic hydrocarbons.

In the simple pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized in the thermal decomposition of hydrocarbon compounds or hydrocarbon mixtures of relatively narrow range, that whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information has been evolved about them in spite of the large number of theories proposed. In general, however, it may be said that starting with paraffin hydrocarbons representing the highest degree of saturation that these compounds are changed progressively into olefins, naphthenes, aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of very little practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using catalysts even in connection with conversion reactions among pure hydrocarbons and particularly in connection with the conversion of the relatively heavy distillates and residue which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

The foregoing brief review of the art of hydrocarbon pyrolysis is given to furnish a general background for indicating the improvement in such processes which is embodied in the present invention, which may be applied to the treatment of pure paraffin or olefin hydrocarbons, hydrocarbon mixtures containing substantial percentages of paraffin hydrocarbons such as relatively close cut fractions producible by distilling petroleum, and analogous fractions which contain unsaturated as well as saturated straight chain hydrocarbons, such fractions resulting from cracking operations upon the heavier fractions of petroleum.

In one specific embodiment the present invention comprises the conversion of aliphatic hydrocarbons including paraffin and olefin hydrocarbons into aromatic hydrocarbons by subjecting them at elevated temperatures of the order of 400–700° C. to contact for definite times of the order of 0.1 to 20 seconds and preferably 1 to 10 seconds with catalytic materials comprising major proportions of relatively inert carriers and minor proportions of mixed oxides of vanadium, chromium, and molybdenum.

In a still more specific and preferred embodiment the catalysts comprise activated aluminum oxide which has received successive and/or alternate deposits of the three types of oxides. For example, a portion of the vanadium oxide desired in the final composite may first be deposited, then a portion or all of the desired quantity of chromium oxides, after which the required amount of molybdenum oxides may be deposited. The order of deposition of the oxides may be varied in any way to produce catalysts of varying effectiveness for the conversion reactions. Thus, for example, the order of deposition in addition to that already given may be chromium, vanadium, and molybdenum; molybdenum, vanadium and chromium; or vanadium, molybdenum and chromium. Gains in catalytic effectiveness may be obtained by first depositing only a portion of some one of the oxides, then depositing the desired amounts of the other two and finally adding the remainder of the third. The extent to which this method of alternate and successive deposition of acids is practiced will depend upon the advantages gained as shown in experimental results, balanced against the greater difficulty of catalyst preparation.

According to the present invention aliphatic or straight chain hydrocarbons having six or more carbon atoms in chain arrangement in their structure are catalytically dehydrogenated in such a way that the chain of carbon atoms undergoes ring closure with the production in the simplest case of benzene from n-hexane or n-hexene in the case of higher molecular weight paraffins of various alkyl derivatives of benzene. Under properly controlled conditions of times of contact, temperature and pressure very high yields of the order of 75 to 90% of the benzene or aromatic compounds are obtainable which are far in excess of any previously obtained in the art either with or without catalysts. For the sake of illustrating and exemplifying the types of hydrocarbon conversion reactions which are specifically accelerated under the preferred conditions by the present types of catalysts, the following structural equations are introduced.

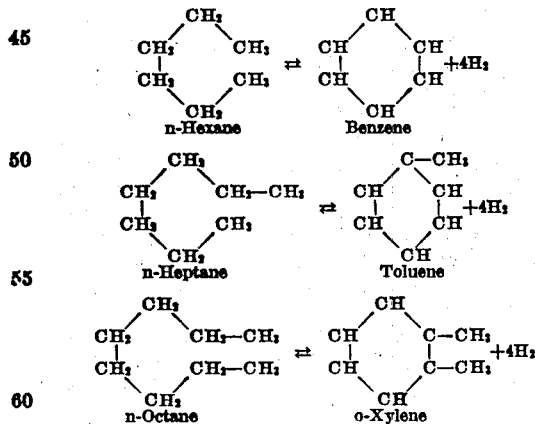

In the foregoing table the structural formulas of the primary paraffin hydrocarbons have been represented as a nearly closed ring instead of by the usual linear arrangement for the sake of indicating the possible mechanisms involved. No attempt has been made to indicate the possible intermediate existence of mono-olefins, diolefins, hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branched chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound 2,3,4-trimethyl hexane, there is formation not only of mesitylene but also of such compounds as methyl ethyl benzol and various propyl benzols.

It will be seen from the foregoing that the scope of the present invention is preferably limited to the treatment of aliphatic hydrocarbons which contain at least 6 carbon atoms in straight chain arrangement. In the case of paraffin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion. Beginning with decane and under the more severe conditions of operation with regard to temperature and time of contact with the catalyst, there is some tendency for the formation of polynuclear cyclic compounds such as naphthalene and anthracene which result from too extensive hydrogenation reactions. However, when conditions are properly chosen, the formation of these compounds may be kept at a practical minimum.

The present invention is characterized by the use of a particular group of composite catalytic materials which employ as their base catalysts or supporting materials certain refractory oxides and silicates which in themselves may have some slight specific catalytic ability in the dehydrogenation and cyclization reactions but which are improved greatly in this respect by the addition of vanadium, molybdenum and chromium oxides in minor proportions. The base supporting materials are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

Magnesium oxide   Montmorillonite clays
Aluminum oxide    Kieselguhr
Bauxite           Crushed firebrick
Bentonite clays   Crushed silica
    Glauconite (greensand)

It should be emphasized that in the field of catalysis there have been very few rules evolved which will enable the prediction of what materials will catalyze a given reaction. Most of the catalytic work has been done on a purely empirical basis, even though at times certain groups of elements or compounds have been found to be more or less equivalent in accelerating certain types of reactions.

In regard to the base catalytic materials which are employed as supports according to the present invention, some precautions are necessary to insure that they possess proper physical and chemical characteristics before they receive the depositions of the oxides. In regard to magnesium oxide, which may be alternatively employed as a carrier, this is most conveniently prepared by the calcination of the mineral magnesite. This mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesium carbonate prepared by precipitation or other chemical methods may be used alternatively in place of the natural mineral. It is not necessary that the carbonate be completely converted to oxide but as a rule it is preferable that the conversion be at least over 90%, that is, so that there is less than 10% of the carbonate remaining in the ignited material.

It is essential to the preparation of the present type of catalysts that the aluminum oxide possess certain structural characteristics permitting the maintenance of a stable deposit of the oxides on its surface which is essentially undisturbed under the conditions of operation and when regenerating by burning off carbonaceous deposits with air or other oxygen-containing gas mixtures. Aluminum oxide which is generally preferable as a base material for the manufacture of catalysts for the process may be obtained from some natural aluminum oxide minerals or ores such as bauxite or carbonates such as dawsonite by proper calcination, or it may be prepared by precipitation of aluminum hydroxide from solutions of aluminum sulfate, nitrate, chloride, or different other salts, and dehydration of the precipitate of aluminum hydroxide by heat. Usually it is desirable and advantageous to further treat it with air or other gases, or by other means to activate it prior to use.

Two hydrated oxides of aluminum occur in nature, to wit, bauxite having the formula $Al_2O_3.2H_2O$ and diaspore having the formula $Al_2O_3.H_2O$. Of these two minerals only the corresponding oxide from the bauxite is suitable for the manufacture of the present type of catalysts and this material has generally given the best results of any of the supporting materials which have been tried. The mineral dawsonite having the formula $Na_3Al(CO_3)_3.2Al(OH)_3$ is another mineral which may be used as a source of aluminum oxide, the calcination of this mineral giving an alkalized aluminum oxide which is apparently more effective as a support in that the catalyst is more readily regenerated after a period of service. Alumina in the form of powdered corundum is not suitable as a support.

It is best practice in the final steps of preparing aluminum oxide as a base catalyst to ignite it for some time at temperatures within the approximate range of from 600–750° C. This does not correspond to complete dehydration of the oxide but gives a catalytic material of good strength and porosity so that it is able to resist for a long period of time the deteriorating effects of the service and reactivation periods to which it is subjected.

The oxide of vanadium which results from the ignition of the nitrate, the hydroxide or the carbonate is principally the pentoxide $V_2O_5$ which is reduced by hydrogen at a red heat to form the tetroxide $V_2O_4$ or the corresponding dioxide $VO_2$ and then to the sesquioxide $V_2O_3$. The production of the deposits of sesquioxide upon the granular carriers (preferably alumina) may be made by the use of the vanadyl nitrate or solutions of ammonium or alkali metal vanadates, some of which furnish alkaline residues on ignition. The use of ammonium vanadate is preferred.

The element chromium has several oxides, the four best known being CrO, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 300° C. The dioxide has been considered to be an equimolecular mixture of the trioxide and the sesquioxide. The oxides are readily developed on the surfaces and pores of alumina granules by utilizing primary solutions of chromic acid $H_2CrO_4$ or chromium nitrate $Cr(NO_3)_3$. The ignition of the chromic acid, the nitrate or a precipitated trihydroxide produces primarily the trioxide which is then reduced to the sesquioxide to furnish one of the catalytic oxides.

The two most impotrant oxides of molybdenum from the standpoint of the present invention are the dioxide $MoO_2$ and sesquioxide $Mo_2O_3$. Since the reduction of the trioxide $MoO_3$ by hydrogen begins at 300° C. (572° F.) and the reduction is rapid at 450° C. (842° F.) the effective catalytic material is principally the sesquioxide. The trioxide may be added to the active alumina carrier from a solution in aqueous ammonia or from a solution of ammonium molybdate which are added in amounts just requisite to wet the carrier granules uniformly after which the mass is dried and ignited.

It is within the scope of the invention to employ the catalytically active oxides and particularly the lower oxides of the three elements mentioned in different proportions and after adding them to the alumina support in different orders, it is seldom essential to the obtaining of good results in dehydrocyclization reactions to employ more than a total of 10% by weight of the combined oxides and usually considerably less, or of the order of 6% total or 2% each of vanadium, chromium, and molybdenum oxides. Instead of using equal amounts of the oxides of the three elements, varying amounts of each may be used as for example 1% vanadium, 3% chromium, and 2% molybdenum oxides. Obviously the catalytic activity and selectivity in fostering the desired dehydrocyclization reactions will vary with the amount and character and order of deposition of the oxides.

The following example is given to indicate that better results are obtained when employing the three oxides on alumina than when employing any combination of two on an equal atomic weight ratio basis.

A catalyst was prepared containing approximately 2% each of vanadium sesquioxide, chromium sesquioxide, and molybdenum dioxide by the successive use of requisite amounts of aqueous solutions of ammonium metavanadate, chromium nitrate, and ammonium molybdate, the excess solution being evaporated after the addition of each compound and the catalyst composite ignited but not reduced until all oxides had been added. Similarly catalysts were prepared containing the same atomic amounts of vanadium and chromium oxides, vanadium and molybdenum oxides, and chromium and molybdenum oxides.

In making the comparative runs, results of which are shown in the following table, a heptane cut boiling between 80 and 100° C. fractionated from a Michigan straight run gasoline was employed as charging stock. This material was vaporized, heated to a temperature of 500° C. under a pressure of approximately 1 atmosphere, and passed at a space velocity of 2.5 per hour over the respective catalysts.

| Oxides on alumina | Production of toluene—parts by weight per hour per 100 parts by weight of catalyst |
|---|---|
| $V_2O_3$, $Cr_2O_3$, $MoO_3$ | 30 |
| $V_2O_3$, $Cr_2O_3$ | 15–20 |
| $V_2O_3$, $MoO_3$ | 17–20 |
| $Cr_2O_3$, $MoO_3$ | 20 |

The above data demonstrates that there is a marked improvement in yield of aromatics when employing the three oxides over the yields obtained when employing any combination of two oxides. No theory will be introduced to account for this phenomenon since very little is known about the question of joint promoter action, the subjection being on a purely empirical basis at the present time.

We claim as our invention:

1. A process for the production of aromatic hydrocarbons from aliphatic hydrocarbons of from 6 to 12 carbon atoms, which comprises dehydrogenating and cyclicizing the aliphatic hydrocarbon by subjection to a temperature of the order of 400 to 700° C. for a period of time of about 0.1 to 20 seconds, in the presence of a mixture of oxides of vanadium, chromium and molybdenum.

2. A process for the production of aromatic hydrocarbons from aliphatic hydrocarbons of from 6 to 12 carbon atoms, which comprises dehydrogenating and cyclicizing the aliphatic hydrocarbon by subjection to a temperature of the order of 400 to 700° C. for a period of time of about 0.1 to 20 seconds in the presence of a solid granular catalyst comprising essentially a major proportion of a carrier of relatively low catalytic activity supporting minor proportions of oxides of vanadium, chromium and molybdenum.

3. A process for the production of aromatic hydrocarbons from aliphatic hydrocarbons of from 6 to 12 carbon atoms, which comprises dehydrogenating and cyclicizing the aliphatic hydrocarbon by subjection to a temperature of the order of 400 to 700° C. for a period of time of about 0.1 to 20 seconds, in the presence of an aluminum oxide catalyst containing relatively small amounts of oxides of vanadium, chromium and molybdenum.

4. The process as defined in claim 1 further characterized in that said aliphatic hydrocarbon is a paraffin.

5. The process as defined in claim 1 further characterized in that said aliphatic hydrocarbon is an olefin.

6. The process as defined in claim 3 further characterized in that said aliphatic hydrocarbon is a paraffin.

7. The process as defined in claim 3 further characterized in that said aliphatic hydrocarbon is an olefin.

ARISTID V. GROSSE.
JACQUE C. MORRELL.